March 4, 1969  F. DOWDEN, JR  3,430,854
READOUT DEVICE FOR TAXICAB METERS
Filed Feb. 17, 1967
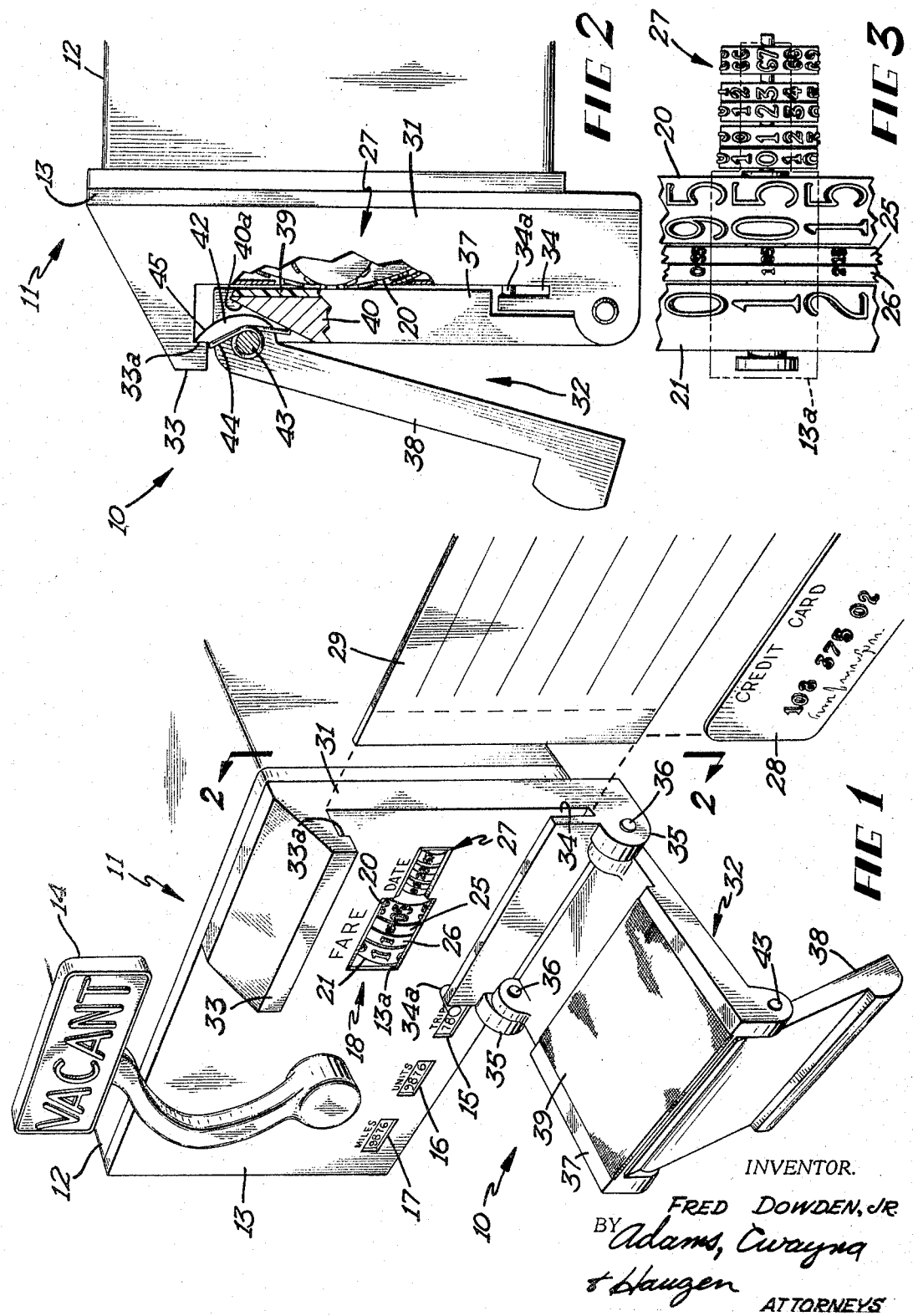
INVENTOR.
FRED DOWDEN, JR.
BY Adams, Cwayng
& Haugen
ATTORNEYS 3,430,854
READOUT DEVICE FOR TAXICAB METERS
Fred Dowden, Jr., Spirit Lake, Iowa 51360
Filed Feb. 17, 1967, Ser. No. 616,879
U.S. Cl. 235—30                                    1 Claim
Int. Cl. G07 *13/00*

ABSTRACT OF THE DISCLOSURE

A readout and indicating device for taxicab meters wherein the meters are provided with fare calculation units, the readout device having printing wheels for indicating a fare calculation, and having indicia thereon for transferring the information to a permanent record directly from the indicating means.

---

A device for translating fee indicating portions of a metering device such as a taxicab meter to a device having coordinated printing elements thereon with a cooperating pressing unit arranged to press a duplicating record card thereagainst such that a record may be of each fare or fee charged and recorded so that the person paying the fee may be provided with a permanent record.

Persons required to travel to any degree on business are always plagued with the problem of maintaining accurate records for tax and business purposes and one mode of transportation for which no remote method of billing and payment and positive record keeping is available is taxicabs. The use of taxicabs always ends in a cash transaction and the rider is left to his own devices for the maintenance of records which due to this self maintenance are always open to criticism.

The structure of applicant's device permits the fare or fee of a metering device such as a taxicab meter to be translated into a printing unit from which a permanent record may be made for the rider's record and further for use as a remote billing system wherein the cab company will, through the use of a recognized credit card, be able to bill the rider on a monthly basis or the like.

A system as above described will not only permit the rider to verify his taxi expense but will also serve as a check for the taxi company of fares properly charged and properly collected.

It is therefore an object of applicant's invention to provide a readout device for metering units such as taxicab meters and the like which readout is coordinated to the reading of the meter.

It is a further object of applicant's invention to provide a printing readout system for a meter device such that the meter fee or fare may be printed upon a recording card.

It is a further object of applicant's invention to provide an impression accomplishing readout and recording system for a meter device whereby an impressionable card may be printed by the readout system by pressing the same thereagainst in cooperation wtih a customer identification card or the like to provide a compositely identified and fare recording billing system.

These and other objects and advantages of my invention will more fully appear from the following description made in connection with the accompanying drawings, wherein like reference characters refer to the same or similar parts throughout the several views, and in which:

FIG. 1 is a perspective view of a typical taxicab meter incorporating applicant's device on the face thereof and illustrating a recording card and a customer identification for use therewith;

FIG. 2 is a vertical section taken subsatntially along line 2—2 of FIG. 1; and

FIG. 3 is a portion of FIG. 1 drawn to an enlarged scale and having portions thereof removed for illustrative purposes.

In accordance with the accompanying drawings applicant's device generally designated 10 is illustrated in operative position upon a taxicab meter 11 which meter functions in the manner generally known to the public. As with any fare indicating taxi meter 11, the meter utilized by the applicant is provided with a cabinet 12 adapted for mounting within the cab having one face 13 exposed. This exposed face is normally provided with an actuating lever 14 and various readout and totalling devices designed to record various charges such as a trip tally 15, unit tally 16, mile tally 17 and the actual fare readout 18.

The face readout 18 utilized in the meter 11 upon which applicant's device 10 is positioned includes a pair of marked wheels, one wheel 20 marked with five cent gradations and the other wheel 21 being marked with dollar gradations.

These wheels are designed to be driven as is known, only when the actuating lever 14 is tripped and normally one complete revolution of the cent wheel 20 will cause a partial revolution of the dollar wheel 21 to indicate the proper dollar amount for each full rotation of the cent wheel 20. The mechanics necessary to drive these face wheels 20, 21 or such other indicating device are well known in the art and forms no fundamental part of applicant's concept and therefore no further explanation of these mechanics is deemed necessary.

As shown in the various views, in order to accomplish printed readout of the recorded fare applicant provides a pair of marking indicia bearing wheels, one of which wheels 25 is designed to correspond to and be driven in conjunction with the cent wheel 20 and the other 26 designed to correspond to and be driven in conjunction with the dollar wheel 21. To accomplish this arrangement each readout wheel 25, 26 corresponds in size to the fare wheels 20, 21 and is respectively arranged in side-by-side connected relation thereto. Each of the readout wheels 25, 26 is provided with radially extending printing indicia thereon which indicia will extend forwardly of the face 13 of the meter 11 such as through the face defining passage 13a.

Arranged adjacent the wheel sets within the face defining passage 13a is a date impression device 27 which is designed with sufficient and properly spaced indicia thereon to indicate the day, month and year of use. Again, such date devices are well known and no further explanation is deemed necessary.

The impression device for transferring the face information, date information and information from a users identification card 28 to a record card 29 is generally designated 10 and includes a frame section 31 and a pressing section 32 arranged cooperatively therewith.

Frame section 31 includes an upper cam hooking element 33 extending forwardly, outwardly and downwardly from the meter face 13 in generally vertical relation to the fare defining passage 13a and a record card 29 and identification card 28 receiving slot 34 in downwardly spaced relation with respect to the hook element 33. A stop member 34a may aid in positioning the record 29 and identification cards 28 in proper relation to each other and to the fare and date indicators.

Pressing section 32 is in the form shown, pivotally attached through appropriate devices such as ears 35 and pins 36 to the lower end of frame 31 and includes a platen plate device 37 arranged adjacent the pivotal connection and a camming lever 38 pivotally arranged on the extending end of platen 37. Platen 37, in the form shown, is provided with a resilient surface 39 for pressing against and receiving the impression making indicia thereon for printing of record card 29 and the rear supporting surface 40 thereof is provided with, as shown in FIG. 2, an upwardly and inwardly beveled surface 40a to permit the hooking and camming end 42 of lever 38 to move freely therepast.

Lever member 38 is pivotally attached to the extending end of platen 37 through pins 43 and a return spring 44 is provided to normally shift the hook engaging end 45 of lever 38 out of hooked relation with the downwardly extending hook 33 of frame 31. The arrangement of the pins 43, lever 38 and hook end 45 permits the platen 37 to be placed in substantially parallel relation to the face 13 of the cabinet 12 and thereafter permit hook 45 to engage with the rearward side 33a of the frame hook 33 and upon downward revolvement thereof urge the platen and held cards into impression forming relation with the face and date impressing units.

The use and operation of the unit should be obvious from the above description and it should also be obvious that the type of record card 29 utilized should be of the composite carbon containing type so as to print several records at a time.

Applicant's device therefore provides a new and unique apparatus for providing a readout for meter systems and particularly taxicab meter systems wherein it is possible to arrange and drive the readout device directly with the fare or fee system but it should be obvious that this readout system could be coordinated with and driven through various mechanical devices to provide a remote readout unit.

What is claimed is:

1. A readout device for taxicab meters and the like which meters are provided with at least a pair of fare indicating units representing cent and dollar value, said device including:
   (a) a first readout member arranged to be coordinately driven with the cent indicating unit and having print wheels with numerical indicia thereon;
   (b) a second readout member arranged to be coordinately driven with the dollar indicating unit and having print wheels with numerical indica thereon;
   (c) means for receiving both a record card and a credit card; and
   (d) means for urging said receiving means against said first and second readout members to form a permanent record from both said print wheels and said credit card on said record card held within said receiving means.

References Cited
UNITED STATES PATENTS

| | | | |
|---|---|---|---|
| 175,656 | 4/1876 | Brooks | 325—33 |
| 911,518 | 2/1909 | Ohmer | 325—33 |
| 1,034,415 | 8/1912 | Bundy | 346—95 |
| 1,251,386 | 12/1917 | Kolar | 346—95 |
| 1,455,530 | 5/1923 | Hoffman | 346—104 |
| 1,527,387 | 2/1925 | Baur et al. | 235—33 |
| 1,736,416 | 11/1929 | Ohmer | 235—30 |
| 1,796,653 | 3/1931 | Heinz | 235—30 |
| 1,846,417 | 2/1932 | Gluck | 235—30 |
| 2,160,032 | 5/1939 | Ohmer | 235—30 |
| 3,214,766 | 10/1965 | Baker et al. | 346—104 |

STEPHEN J. TOMSKY, *Primary Examiner.*

S. A WAL, *Assistant Examiner.*